March 1, 1927.
C. C. VAN NUYS
1,619,169
APPARATUS FOR SEPARATING THE CONSTITUENTS OF GASEOUS MIXTURES
Original Filed Sept. 9, 1920
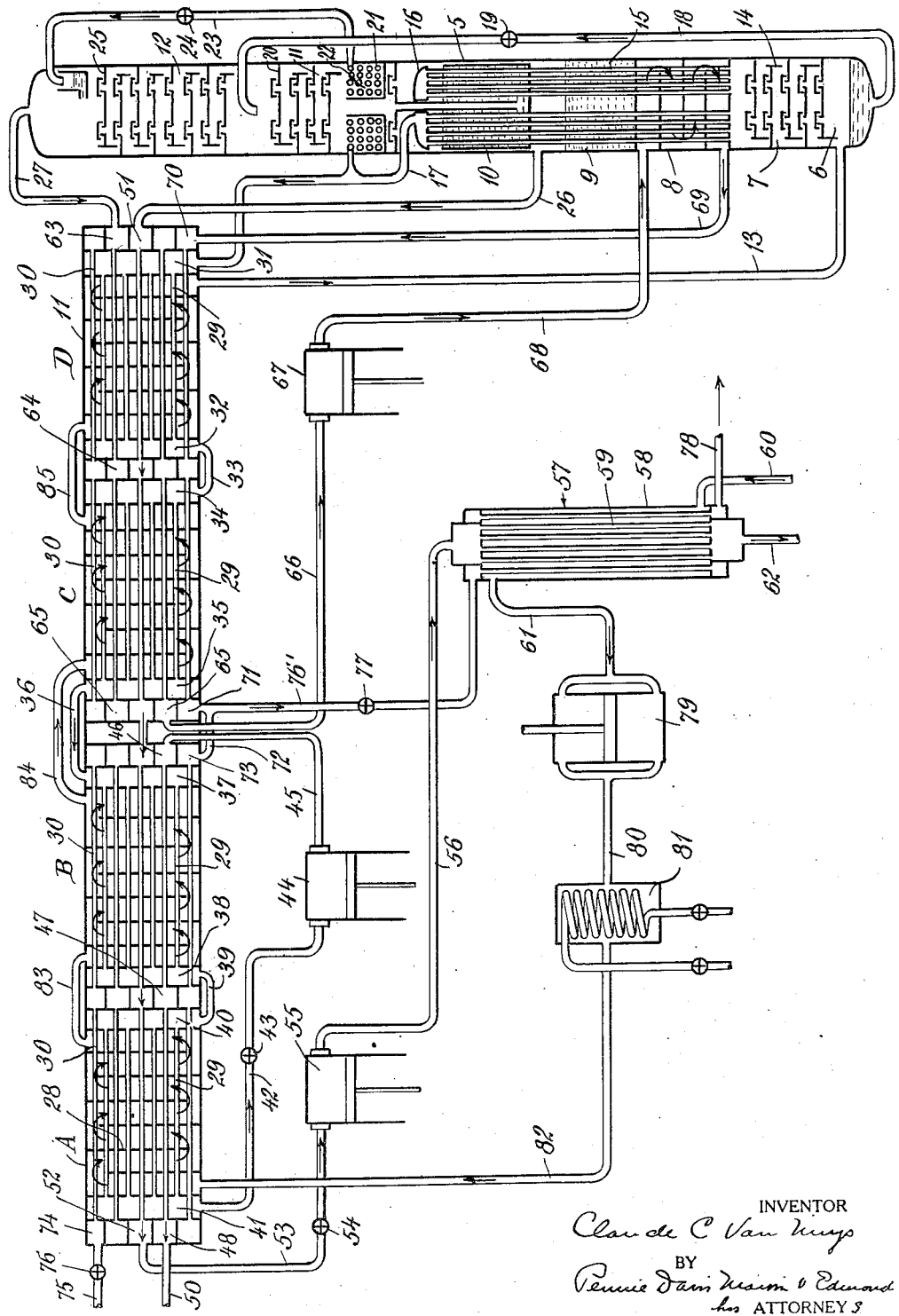
INVENTOR
Claude C. Van Nuys
BY
Pennie Davis Marvin & Edmonds
his ATTORNEYS Patented Mar. 1, 1927.

1,619,169

UNITED STATES PATENT OFFICE.

CLAUDE C. VAN NUYS, OF CRANFORD, NEW JERSEY, ASSIGNOR TO AIR REDUCTION COMPANY, INCORPORATED, OF NEW YORK, N. Y., A CORPORATION OF NEW YORK.

APPARATUS FOR SEPARATING THE CONSTITUENTS OF GASEOUS MIXTURES.

Original application filed September 9, 1920, Serial No. 409,096. Divided and this application filed December 6, 1924. Serial No. 754,281.

This invention relates to the liquefaction and separation of the constituents of gaseous mixtures, and is particularly applicable to the recovery of oxygen and nitrogen from the atmosphere, although the principles hereinafter described may be employed in separating the constituents of gaseous mixtures other than air.

This application is a division of application Serial No. 409,096, filed Sept. 9, 1920, now Patent No. 1,539,528.

Separation of the constituents of a binary gaseous mixture is accomplished in accordance with a well known method by compression and cooling of the mixture, followed by a liquefaction in two fractions, at a pressure somewhat below the initial pressure of the mixture. The first liquid fraction is obtained by a selective condensation in a tubular condenser employing the principle of "backward return" so as to obtain a liquid enriched in the less volatile constituent to which is added sufficient unenriched liquefied mixture, obtained from a separate condenser called the "liquefier", to make up for losses due to heat leakage.

The second fraction consisting substantially of the more volatile constituent delivered at the top of the "backward return" tubular condenser is, after it has been liquefied by indirect contact with liquids accumulated at the bottom of the rectification column, delivered to the rectifier at a level somewhat higher than the level at which the liquid constituting the first fraction enters the rectifier. This second liquid fraction is expected to wash the less volatile constituent from the ascending vapors by reciprocal evaporation and condensation, and to thus permit liquefaction of that constituent in a substantially pure condition.

In the normal operation of such a method, an effluent gas is obtained which contains amounts of the more easily condensible constituent of the original gaseous mixture to be separated far in excess of the theoretic minimum, and the escape of this constituent in the effluent gas represents a serious loss of efficiency of the method. The result described may be explained by reference to the application of the prior method to the separation of the constituents oxygen and nitrogen from the atmosphere.

Let us assume that the tubular condenser in which the selective condensation takes place is sufficiently efficient so that the unliquefied gas leaving the top of the tubes is composed substantially of the more volatile constituent, nitrogen, while the enriched liquid obtained at the bottom of the condenser is a liquid of maximum possible degree of enrichment in oxygen, that is, it is that liquid which will be in phase equilibrium with the gaseous mixture entering the bottom of the condenser. Under these conditions, it is clear that the amount of unliquefied nitrogen leaving the top of the condenser is a maximum. If the composition in oxygen of the enriched liquid constituting the first fraction is less than the limit composition just specified, then the amount of the second fraction, i. e., the unliquefied nitrogen leaving the top of the tubular condenser, will be less. In the normal operation of this method, the attempt is generally made to produce an enriched liquid at the bottom of the tubular condenser whose composition is such that the amount of nitrogen leaving the top of the condenser and constituting ultimately the second liquid fraction is just sufficient to deprive the vapors ascending at the level in the rectification column at which the first liquid fraction is delivered thereto of the oxygen contained in those vapors.

This being the case, it is clear that the method fails to take advantage of the maximum possible degree of oxygen enrichment attainable in accordance with the principle of condensation by "backward return." On the contrary, this enrichment is carried on only to that point where the amount of unliquefied nitrogen is most suitable for the requirements of the subsequent rectification. Due, however, to unavoidable variations in quantity and composition of the enriched liquid obtained at the bottom of the condenser by reason of variations of operating conditions, and further by reason of the fact that atmospheric air is not a simple binary mixture, the consequences of which fact will be noted presently, it is found necessary in the operation of this method, in order to insure proper rectification and obtain substantially pure oxygen, to evaporate and cause to ascend in the column an excess of oxygen with the result that upward to 30% of the air treated escapes from the top of the rectification column unseparated. This result, as stated, is in part a consequence of the fact that atmospheric air contains, in addition to minute quantities of carbon dioxide, moisture and the rare elements, helium, neon, xenon and krypton, substantially 1% of argon, of which the saturated vapor pressure corresponding to any temperature is intermediate between those of oxygen and nitrogen at the corresponding temperature. In fact, the boiling point of argon at ordinary pressures is only 3 to 4 degrees lower than that of oxygen. Hence, when air is selectively liquefied with "backward return", we should expect to find the major portion of the argon thereof contained in the liquid fraction, the argon content of this liquid increasing as the liquefied fraction of the air is increased. If all the argon present in air was contained in the enriched liquid, then assuming that this argon is not subsequently removed, it would be impossible to obtain oxygen of a purity greater than about 95% since the argon, being 1% of the whole mixture, would be approximately 5% of the oxygen contained therein. Actually, however, argon will be present both in the enriched liquid delivered at the bottom of the tubular condenser and in the unliquefied residue leaving the top thereof, and the amount of argon leaving the top will be greater according as the amount of nitrogen drawn therefrom is greater. It is clear, therefore, that it will be of advantage to carry the oxygen enrichment of the liquid condensed in and obtained at the bottom of the tubes to the maximum possible degree.

An object of the present invention is the provision of an apparatus for rectifying liquefied gases to separate the constituents of gaseous mixtures represented thereby in an improved, economical and efficient manner, and permitting the recovery of a large portion of the energy originally employed in raising the gas to its initial pressure.

The objects and advantages of the invention will be apparent as it is better understood by reference to the following specification and accompanying drawing in which an apparatus which is capable of use in connection with the method is diagrammatically illustrated. The details of the apparatus may be widely varied, and no attempt has been made to illustrate such details and thereby obscure the purpose of the drawing.

The difficulties heretofore experienced in the separation of gaseous mixtures by liquefaction and rectification as above noted, may be overcome to a large degree by the delivery to the rectification column of a regulated quantity of a liquid obtained by liquefying only a part of the residual gas drawn from the top of the "backward return" condenser. This portion of the residual gas is liquefied while still under the condenser pressure by passing it through a coil surrounded by liquids accumulating at the base of the rectification column and then, after its pressure has been released by a reducing valve to that of the rectifier, it is employed therein as a clarifying liquid, and thus there is left available a considerable amount of the residual gas at the original pressure prevailing in the tubular condenser.

The relatively high pressure residual gas, after its temperature has been raised to any desired point by heat interchange with the incoming mixture, may be profitably employed in an expansion engine or turbine to assist in the necessary refrigeration of the system, as well as to recover a portion of the energy originally expended in raising the pressure of the mixture to the point necessary for operation of the cycle. A considerable portion of the argon content of the original air will be eliminated with the residual gas, rendering it possible to attain a higher purity of oxygen at the base of the rectification column with less loss of oxygen in the effluent gas leaving the top of the column.

In carrying out one embodiment of the method, air for example, compressed and cooled in the customary manner, is delivered to a column in which it is subjected to indirect contact with colder liquid or gaseous products, and the portion of the air thus liquefied is permitted to return in contact with further quantities of air and to accumulate in the bottom of the column. Preferably, though not necessarily, this liquid is subjected during its backward passing to a partial rectification by contact with the incoming air for the purpose of insuring that the liquid will contain the maximum quantity of oxygen possible, this being substantially 47% or a composition which is in phase equilibrium with the incoming air. During its upward passage, the air is cooled sufficiently by indirect contact with the cold liquid or gaseous products to separate all of the oxygen and a portion of the nitrogen so that the residual unliquefied gas is substantially nitrogen, a portion which is liquefied and utilized as a clarifying liquid in the rectifier while the balance is available for the purposes noted.

The accumulated liquid consisting principally of oxygen and nitrogen, the oxygen being in proportion of approximately 47%, is then delivered to the rectifying compartment through a reducing valve which permits the reduction of pressure and the low temperature necessary in order that liquid oxygen collecting at the bottom of the rectifier may liquefy selectively the incoming air by indirect contact therewith, and be vaporized thereby. The liquid is delivered to the middle part of the rectification column and descends thence over the usual trays in contact with vapors rising from the accumulated body of liquid which is vaporized as explained above. A partial rectification is thereby accomplished, and the liquid finally accumulating in the lower liquid compartment is substantially oxygen which is vaporized in cooling additional quantities of the compressed air. The vaporized oxygen may be drawn off at a substantial pressure and after being warmed by heat interchange with the incoming air, it may be expanded in a suitable engine to recover another portion of the work originally expended in raising the air to its initial pressure.

The vapor passing upwardly from the lower part of the rectifier contains a substantial proportion of oxygen, and to prevent the escape of the major portion of this oxygen and thereby increase the efficiency of rectification the proper proportion of liquefied residual gas or nitrogen is delivered to the upper part of the rectifier where it serves as a clarifying liquid to wash substantially all of the oxygen from the rising vapors. The effluent vapors leaving the rectifier and consisting substantially of nitrogen may be expanded after heat interchange with the incoming air to recover energy originally expended in compressing the air.

The argon content of the enriched liquid constituting the first liquid fraction, being by the operation of this method less than in the case where the oxygen enrichment of this liquid is carried to a less degree, the rectification of this liquid may be accomplished without it being necessary to vaporize and pass upward in the column as large an amount of oxygen to prevent the oxygen purity at the base of the column becoming reduced by the presence of argon. Although the argon percentage of the clarifying liquid delivered at the top of the column is greater in this method than in the prior method described, the actual amount of argon in the liquid state delivered to the top of the column will be considerably less in absolute amount since only a portion of the residual gas delivered at the top of the "backward return" condenser is liquefied for use as clarifying liquid. Thus the method, in addition to possessing the advantage of reducing the actual amount of argon necessary to be eliminated in the rectification column from the oxygen product, possesses the further advantage of forcing the actual argon passing through the rectification column to concentrate toward the upper regions of said column and thus to increase its tendency to elimination with the effluent gas.

A further advantage of the method lies in the fact that the amount of clarifying liquid delivered to the top of the column may be regulated independently of the amount of enriched liquid produced in the "backward return" condenser and thus this regulation may be adapted more closely to the requirements of the enriched liquid and the adjustment may follow more closely any variations in the quantities and composition of the enriched liquid due to variable operating conditions. Another important advantage of the method lies in the fact that it permits the recovery of a large portion of the energy originally expended in raising the gas to its initial pressure since it renders available a considerable amount of residual gas at the original pressure of the "backward return" condenser.

With this brief description of the method of operation, the apparatus and mode of applying the invention will be more clearly understood with relation to the drawing which illustrates diagrammatically an apparatus for use in practicing the invention. It is to be understood, however, that the method and apparatus are of general application and that no limitation is implied, therefore, by reference to the atmosphere or to the particular apparatus illustrated. In the drawing, 5 indicates a column having a liquid pot 6, a rectifying compartment 7, a refrigerating chamber or "liquefier" 8, a liquid compartment 9 in which a liquid receptacle 10 is suspended, and upper and lower rectifying chambers 11 and 12. Cold compressed gas is delivered to the pot 6 through a pipe 13 and passes thence through the trays 14, on which liquid accumulates for the purpose of separating any excess of nitrogen from this liquid. The gaseous mixture passes thence through tubes 15, which extend through the gas chamber 8, liquid compartment 9 and receptacle 10 to a head 16. Nitrogen is withdrawn from the head through a pipe 17.

The liquid accumulating in the pot 6 is delivered therefrom through a pipe 18 having a reducing valve 19 to the lower rectifying compartment 11 where it accumulates on trays 20 of usual form, and also in a receptacle 21 disposed between the lower trays and provided with a coil 22, one end of which is connected to the pipe 17 while the other communicates with a pipe 23 having a reducing valve 24, which delivers the nitrogen liquefied in the coil to the upper compartment of the rectifier. The liquid nitrogen passes downwardly over trays 25 and joins the liquid delivered through the pipe 18.

The liquid accumulating in the compartment 9 is substantially pure oxygen, and as the liquid is evaporated by indirect contact with the gaseous mixture in the tubes 15 the oxygen is withdrawn through a pipe 26. Vapors arising from the receptacle 10 pass upwardly through the trays 20 and 25 in direct contact, first, with the liquid delivered through the pipe 18, and then with the liquid nitrogen delivered through the pipe 23. In the rectifying compartment, the oxygen in the vapor is liquefied and joins the downwardly flowing liquid. Nitrogen is at the same time separated from the downwardly flowing liquid and thus the effluent gas from the rectifier becomes substantially pure nitrogen. By proper regulation and control of the amount of liquefied nitrogen delivered to the rectifier, it becomes possible to separate a greater proportion of the oxygen from the incoming air than has heretofore been practicable.

To insure proper transfer of cold from the outgoing gases to the incoming gaseous mixture, an exchanger of temperature is employed comprising a plurality of compartments A, B, C and D, each compartment being divided by baffles 28, to cause the air to circulate therein about two sets of pipes 29 and 30, through which the gases escaping from the column are conveyed. The nitrogen, for example, escaping through the pipe 17, is, with the exception of that portion which passes through the coil 22, delivered to a compartment 31 at one end of the section D of the exchanger and passes thence through tubes 29, communicating with the compartment, to a compartment 32 at the other end of the section. The nitrogen is delivered by a pipe 33 to a corresponding compartment 34 of the section C and passes through tubes 29 therein to a compartment 35. Thence the nitrogen is conveyed through a pipe 36 to a compartment 37 at one end of the section B of the exchanger, passes through the tubes 29 of the exchanger to a compartment 38, thence through a pipe 39 to a compartment 40 at the end of the section A of the exchanger wherein it is conveyed through tubes 29 to a compartment 41. From the compartment 41, the nitrogen is withdrawn through a pipe 42 having a controlling valve 43 and is delivered to the expansion engine 44 where it is expanded with external work and the temperature is accordingly reduced. From the engine the expanded gas is delivered through a pipe 45 to a compartment 46 at one end of the section B of the exchanger. Thence the gas passes through tubes 30 to a compartment 47 between the section A and B. Tubes 30 in the section A convey the expanded gas to a compartment 48 at the end of the section A to which an outlet 50 for the nitrogen is connected. The nitrogen is delivered at substantially atmospheric temperature and pressure and may be stored for utilization in any suitable manner.

The oxygen delivered from the column through the pipe 26 enters a compartment 51 at the end of the section D of the exchanger and passes through the tubes 30 in the several sections thereof to a chamber 52 at the end of the section A whence it is delivered through a pipe 53 having a controlling valve 54 with engine 55 where the oxygen is expanded with external work and thereby cooled. From the engine 55 the expanded oxygen is delivered through a pipe 56 to a pre-cooler 57 consisting of a shell 58 and a bundle of tubes 59 about which the incoming air circulates, the air being introduced through a pipe 60 and delivered through a pipe 61. The oxygen from the pipe 56 passes through a bundle of tubes 59 and is delivered through a pipe 62 at substantially atmospheric pressure and temperature and may be stored for suitable use.

The effluent gas from the rectifier is delivered by the pipe 27 to a compartment 63 of the section D of the exchanger and passes thence through tubes 30 to a compartment 64 whence it travels through tubes 30 in the section C of the exchanger to a compartment 65. From this compartment the gas is withdrawn and is delivered by a pipe 66 to an expansion engine 67 where the gas is expanded with external work and is consequently cooled. From the engine 67 a pipe 68 conveys the gas to the chamber 8 in the column where the gas circulates about the tubes 15 and serves to cool the incoming air and liquefy portions thereof. From the compartment 8 the gas escapes through a pipe 69 to a compartment 70 at the end of the section D of the exchanger and is delivered thence through tubes 30 in the sections C and D of the exchanger to a compartment 71. A pipe 72 conveys the gas to a compartment 73 at the end of section B of the exchanger, and the gas is delivered thence through tubes 30 in the sections A and B to a compartment 74, the gas escaping through a pipe 75, controlled by a valve 76 at substantially atmospheric pressure and temperature. A portion of the effluent gas may be withdrawn from the pipe 72 through a pipe 76' controlled by a valve 77, which delivers the gas to the pre-cooler 57. Thus the pre-cooling of the air may be regulated as desired. The gas thus delivered to the pre-cooler escapes through a pipe 78, and may be stored for utilization.

It is to be understood that cooling of chamber 8 may be accomplished by delivering cold expanded nitrogen thereto instead of the expanded effluent gas. In this event, the cold of the expanded effluent gas will be utilized in the exchanger, the change requiring merely a slight rearrangement of the gas conveying pipes. As previously noted, the disposition of the cold expanded gases will depend more or less on the relative volumes thereof which are available.

The air cooled in the pre-cooler is delivered by a pipe 61 to a compressor 79, where it is compressed and delivered through a pipe 80 to a water cooler 81. Thence the compressed and cooled gas is delivered through a pipe 82 to the section A of the exchanger where it travels about the baffles 28, and is delivered through pipes 83, 84, and 85, to the successive sections of the exchanger where the cooling is completed. The air finally passes from the exchanger through the pipe 13 to the pot 6 at the bottom of the column.

Assuming, therefore, that the apparatus is in operation, it will be seen that the cooled compressed gas is successively subjected to the cooling influence of cold expanded gases and accumulated liquid, and that the liquid fraction resulting is rectified to produce a liquid as rich in oxygen as is possible under the conditions prevailing. This liquid is subsequently rectified and the vapors produced are caused to contact with liquid nitrogen in quantity sufficient to insure the separation of substantially all of the oxygen. The products of the method described are substantially pure oxygen, and substantially pure nitrogen, and both gases may be utilized commercially without further treatment. The provision of a regulated supply of liquid nitrogen for rectification purposes not only provides more efficient rectification and separation of the constituents of the gaseous mixture, but it facilitates regulation and permits balancing the operation in such a way as to insure a maximum output of the product with a minimum of attention. Separation of the constituents of the gaseous mixture is accomplished at a pressure only slightly below the initial pressure to which the gas is raised, and the products escape at the initial pressure, or the pressure of separation. The expansion of the products following liquefaction, and after these products have been warmed by contact with the incoming air, insures the recovery of a large proportion of the energy consumed in raising the gaseous mixture to its initial pressure. The energy recovered may be employed in compressing further quantities of gas with such additions of energy as are requisite to provide the necessary pressure.

The apparatus is readily placed in operation since it is self-cooling to a marked degree, and consequently it is necessary merely to start compression and to direct the products of expansion in the engines to the proper points to quickly decrease the temperature of the apparatus and accumulate a body of liquid therein. Thereafter the operation is substantially automatic as described.

From the foregoing description, it will be apparent that the method recited in the present application as well as the apparatus adapted for use therein, marks a distinct forward step in the art of separating gaseous mixtures. It becomes possible thereby to provide a much closer and more efficient separation of the constituents of a gaseous mixture, and to recover both constituents in a substantially pure condition.

Various changes may be made in the details of the apparatus, without departing from the invention or sacrificing any of the advantages thereof.

I claim:

1. In an apparatus for separating the constituents of a gaseous mixture by liquefaction, the combination of a column having a plurality of tubes for the passage of the mixture, a chamber surrounding the tubes to receive liquid, a head in which the tubes terminate, means for withdrawing residual unliquefied gas from the head, means for non-selectively liquefying a regulated portion of the residual gas thus withdrawn, means for diverting the remainder of the residual gas from the liquefying means, a rectifying compartment and means for delivering liquid produced in the tubes and the liquefied residual gas to the rectifying compartment.

2. In an apparatus for separating the constituents of a gaseous mixture by liquefaction, the combination of a column having a plurality of tubes for the passage of the mixture, a chamber surrounding the tubes to receive liquid, a head in which the tubes terminate, means for withdrawing residual unliquefied gas from the head, means for non-selectively liquefying a regulated portion of the residual gas thus withdrawn, means for diverting the remainder of the residual gas from the liquefying means, a rectifying compartment, means for delivering liquid produced in the tubes and the liquefied residual gas to the rectifying compartment, and means for utilizing the remainder of the unliquefied residual gas for the recovery of energy therefrom.

3. In an apparatus for separating the constituents of a gaseous mixture by liquefaction, the combination of a column having a plurality of tubes for the passage of the mixture, a chamber surrounding the tubes to receive liquid, a head in which the tubes terminate, means for withdrawing residual unliquefied gas from the head, means for non-selectively liquefying a regulated portion of the residual gas thus withdrawn, means for diverting the remainder of the residual gas from the liquefying means, a rectifying compartment, means for delivering liquid produced in the tubes and the liquefied residual gas to the rectifying compartment, an exchanger of temperature wherein the remainder of the unliquefied residual gas is warmed by indirect contact with the incoming mixture and an engine in which the residual gas is expanded.

4. In an apparatus for separating the constituents of a gaseous mixture by liquefaction, the combination of a column having a plurality of tubes for the passage of the mixture, a chamber surrounding the tubes to receive liquid, a head in which the tubes terminate, a pipe for withdrawing the residual unliquefied gas, a rectifying compartment, a coil in said compartment and connected to the pipe to non-selectively liquefy a regulated portion of the residual gas, means for diverting the remainder of the residual gas from the coil and means for delivering liquid produced in the tubes and coil to the rectifying compartment.

In testimony whereof I affix my signature.

CLAUDE C. VAN NUYS.